United States Patent
Schlatterbeck et al.

(10) Patent No.: US 7,927,669 B2
(45) Date of Patent: Apr. 19, 2011

(54) METHOD FOR APPLYING COATINGS TO SURFACES

(75) Inventors: Dirk Schlatterbeck, Zurich (CH); Andre F Ceppi, Gross (CH); Frank Jenne, Winterhur (CH); Andreas Singer, Wald (CH)

(73) Assignee: Schmid Rhyner AG, Adliswil-Zurich (CH)

( * ) Notice: Subject to any disclaimer, the term of this patent is extended or adjusted under 35 U.S.C. 154(b) by 1476 days.

(21) Appl. No.: 10/516,267

(22) PCT Filed: May 30, 2003

(86) PCT No.: PCT/EP03/05711
§ 371 (c)(1),
(2), (4) Date: Jun. 13, 2005

(87) PCT Pub. No.: WO03/099456
PCT Pub. Date: Dec. 4, 2003

(65) Prior Publication Data
US 2005/0255249 A1    Nov. 17, 2005

(30) Foreign Application Priority Data
May 29, 2002 (DE) .................................. 102 24 128

(51) Int. Cl.
B05D 5/06 (2006.01)
B05D 1/02 (2006.01)
B05D 3/06 (2006.01)

(52) U.S. Cl. ........ 427/510; 427/162; 427/422; 427/424; 427/427.3; 427/427.4; 427/270; 427/271; 427/333; 427/558; 427/595; 427/384; 427/386; 427/407.1

(58) Field of Classification Search .................. 427/508, 427/510, 511, 553, 558, 561, 595, 256, 258, 427/261, 286–288, 372.2, 384–387, 404, 427/407.1, 419.1, 162, 422, 424, 427.3, 427.4, 427/270, 271, 333
See application file for complete search history.

(56) References Cited

U.S. PATENT DOCUMENTS

| | | | | |
|---|---|---|---|---|
| 4,220,115 A | | 9/1980 | Brossman et al. ............ 118/684 |
| 4,628,330 A | * | 12/1986 | Suga et al. ....................... 347/54 |
| 5,993,551 A | | 11/1999 | Hahn ............................. 118/315 |
| 6,114,406 A | * | 9/2000 | Caiger et al. .................. 522/121 |
| 6,294,592 B1 | * | 9/2001 | Herrmann et al. ............... 522/75 |
| 6,482,288 B1 | * | 11/2002 | Kreckel et al. ................. 156/247 |
| 6,547,617 B1 | | 4/2003 | Kawamura et al. |
| 2001/0052920 A1 | * | 12/2001 | Matsumoto et al. .......... 347/102 |
| 2003/0083396 A1 | * | 5/2003 | Ylitalo et al. .................... 522/74 |

FOREIGN PATENT DOCUMENTS

| | | |
|---|---|---|
| CN | 1136790 | 11/1996 |
| DE | 100 31 030 A1 | 1/2002 |
| DE | 10057528 | 5/2002 |
| JP | 08-080465 | 3/1996 |
| JP | 08-242060 | 9/1996 |
| JP | 11-138672 | 5/1999 |
| JP | 11-138915 | 5/1999 |
| JP | 2000-326476 | 11/2000 |
| JP | 2002-082216 | 3/2002 |
| WO | WO01/47724 | 7/2001 |

OTHER PUBLICATIONS

Office Action dated Sep. 17, 2008 corresponding to Japanese Patent Application No. 2004-506971.
Office Action dated Feb. 9, 2007 corresponding to Chinese Patent Application No. 03817289.9.
Office Action dated May 11, 2009 corresponding to European Patent Application No. 06023101.6-2425 (with translation).
Decision of the European Patent Office dated Apr. 7, 2010 corresponding to European Patent Application No. 03740164.3 with English translation.
"Römpp Lexikon Lacke und Druckfaben," p. 225, entry Farbstrahldruck, Georg Thieme Verlag, 1998.
"Handbuch der Printmedien: Technologien und Producktionsverfahren," Springer, 2000; Chapter 5: "Druckverfahren ohne Druckform," pp. 709-793.

* cited by examiner

*Primary Examiner* — William Phillip Fletcher, III
(74) *Attorney, Agent, or Firm* — Ohlandt, Greeley, Ruggiero & Perle, LLP (57) ABSTRACT

A method and apparatus for applying coatings, such as in particular varnishes, to surfaces is provided. The apparatus includes a metering head that has at least one nozzle which can be actuated by a control signal. The method includes the steps of: moving a base having a surface that is to be coated along this surface relative to a metering head and/or moving the metering head relative to a surface of the base, and applying a fluid coating material to the surface through a nozzle in response to at least one control signal generated by a computer.

33 Claims, 8 Drawing Sheets

METHOD FOR APPLYING COATINGS TO SURFACES

BACKGROUND OF THE INVENTION

1. Field of the Invention

The invention relates to a method for applying coatings to surfaces, and to an apparatus for coating surfaces, in particular to a method for the contactless application of coatings to surfaces and to an apparatus for the contactless coating of surfaces.

2. Description of Related Art

A range of contactless methods are known for coating surfaces with plastics or varnishes. Spraying, flooding, extrusion, pouring or dipping methods or coating by means of slot dies or cap coating are among the methods used for this purpose. However, all these methods are relatively unsuitable or at least highly complex for highly accurate metering of the coating material. In particular, coating methods of this type are also unsuitable or at least of only limited suitability for the selective coating of selected regions of the surface. On the other hand, targeted coating of selected regions can be achieved, for example, by subsequent patterning, for example the patterning of photoresists by exposure and developing. These resists are applied to substrates, generally by spin-on coating, making it possible to produce particularly thin and homogenous coatings of photoresist. However, the subsequent patterning requires additional working operations.

Furthermore, the printing industry has disclosed methods for the subsequent patterning of printing forms, for example photopolymer plates for flexographic printing or printing plates for offset printing, in which the printed image is produced on a substrate which has been coated over the entire surface by writing or selective exposure by means of a mask. However, these methods are very complicated and expensive, and therefore the costs and work involved is only worthwhile for large print runs.

BRIEF SUMMARY OF THE INVENTION

Therefore, the invention is based on the object of providing a method and an apparatus which provide highly accurate metering of the coating material, on the one hand, and the option of selective coating of selected regions or of accurate patterning, on the other hand, during the coating of surfaces. This object is achieved, in a very surprisingly simple way, by the method as claimed in claim 1. Advantageous refinements form the subject matter of the corresponding dependent subclaims.

Accordingly, the method according to the invention for applying coatings or coating materials and chemical reagents, such as in particular varnishes, to surfaces using an apparatus which comprises a metering head that has at least one nozzle which can be actuated by a control signal, comprises the steps of:

moving a base having a surface that is to be coated along this surface relative to the metering head or moving the metering head relative to the surface over the entire surface and/or moving the metering head relative to a surface of a base which is to be coated, and applying a fluid material to the surface through the nozzle in response to at least one control signal generated by a computer.

The at least one nozzle may also include a plurality of nozzles in a grid or array which produces a pattern by targeted response of individual nozzles.

Therefore, the method according to the invention can be used to apply materials, e.g. coating materials, such as in particular varnishes, in an accurately metered manner to the surface that is to be coated. The computer-controlled actuation of the at least one nozzle in combination with the movement of the base along the surface relative to the metering head also allows precisely accurate, patterned coating of the surface.

In the present context, the term fluid coating material encompasses both liquid and gaseous materials. This term also covers viscous substances. Viscous materials of this type may, for example, be applied in warmed or heated form, for example in order to control the viscosity of the material.

The fluid coating material may, according to the invention, be applied with particular success by spraying on droplets through a nozzle if the application is carried out using a viscosity of the coating material of from 8 to 100 mPa·s, preferably 8 to 50 mPa·s, particularly preferably 8 to 25 mPa·s.

According to one embodiment of the invention, however, it is also possible to process fluid materials, which have a significantly higher viscosity at room temperature. For example, the process according to the invention and an apparatus according to the invention of suitable design can also be used to process fluid materials with a viscosity at room temperature in a range from 50 mPa·s to 10 Pa.s, preferably from 50 mPa·s to 1 Pa·s, particularly preferably from 50 mPa·s to 250 mPa·s. By way of example, for this purpose the fluid coating material can be preheated in order to reduce the viscosity. Accordingly, according to one embodiment of the invention the apparatus according to the invention has a preheating device for heating the fluid material.

For example, the viscosity can be reduced by heating the fluid coating material to up to 300° C., preferably to up to 125° C., particularly preferably to up to 80° C. It is then possible for even highly viscous fluid coating materials to be applied, for example using a piezo electric ink-jet print head. In particular in the case of low-viscosity coating material with a viscosity in the range of up to 250 mPa·s, by heating the material it is possible to lower the viscosity by heating to 30 mPa·s or below.

However, as an alternative or in addition, the heating may also take place in the nozzle of the metering head. Heating also takes place, for example, in a nozzle of a bubble-jet print head. Even in the case of fluid coating materials with relatively low viscosities, preheating may be advantageous in order to lower the viscosity and/or surface tension of the material and thereby to obtain smaller drop sizes during contactless application and more accurate metering.

In addition to a reduction in viscosity by an increase in temperature, other measures may also be advantageous in order to allow the processing of coating materials with a high or medium viscosity. Measures of this type are advantageous, inter alia, if a reduction in the viscosity of the coating material achieved by heating is insufficient for processing or if the coating material is not allowed to be heated. By way of example, the lateral resolution during coating may be reduced. Also, the drop frequency or the frequency of the control signals which actuate the nozzle can be matched to the viscosity of the coating material.

A suitable modification of the metering head, for example a modification of the nozzles and/or chambers of an ink-jet print head to match the coating material, may also be suitable to allow the processing of coating materials of this type.

The fluid coating material may also be fed to the nozzle under superatmospheric pressure. For this purpose, the apparatus according to the invention may, for example, have at least one pump device connected upstream of the nozzle as superatmospheric pressure system. A refinement of this nature to the method according to the invention and/or to the apparatus according to the invention may, however, be advantageous not only for the processing of coating materials with a high and medium viscosity. For example, a suitable superatmospheric pressure system can also be used to reduce the drop size and/or to increase the processing rate.

Not least on account of the advantages of contactless coating, the method is virtually unrestricted with regard to the material and surface condition of the base that is to be coated. By way of example, the method according to the invention can be used for contactless coating or varnishing on bases comprising cellulose-containing materials, such as paper, cardboard or wood. Other bases which can be coated include glass, ceramic, metal or plastics, textiles, fleece materials and composite materials. The coatings may have both decorative and functional properties, for example for surface sealing or as a barrier. By way of example, the coating according to the invention, on account of the option of patterning the coating, can also be used to produce highly accurate printing templates for various printing processes, such as offset printing or screen printing, in a fast and extremely simple way. Furthermore, the method can also be used, by application of suitable adhesives, in particular adhesives with a low filling level, for laminating or targeted adhesive bonding of specific parts of the surface. The coating can be applied both to the entire surface and to certain regions while leaving out other regions. By way of example, the method according to the invention can be used for the targeted application of hot melt or reactive adhesives (e.g. UV-curing adhesives). In this context, mention should be made of the method, which is conventional in the textile industry, for the accurate adhesive bonding of fleece material as a replacement for stitching together various layers of textiles (e.g. for lining jackets).

It is also possible for regions of different layer thickness to be produced by corresponding actuation of the metering head or of the nozzle, in order, for example, to produce three-dimensionally patterned coatings. One example which can be mentioned is a pattern which has the so-called lotus flower effect. Moreover, it is possible for regions of different materials to be applied next to and on top of one another. However, the method is also suitable for the local application of chemical reagents, inter alia including for the etching of surfaces, so that, for example, it is also possible to produce indented surfaces.

Particularly accurate metering or patterning can be achieved in this context if the application is performed through a bubble-jet nozzle and/or an ink-jet or piezo-jet nozzle. Nozzles of this type, or corresponding metering heads, as are used in a similar way in ink-jet printers, can be used for the targeted application of extremely small quantities of liquid coating material in the region of a few nanograms in response to a control signal.

Ink-jet or piezo-jet nozzles also have the further advantage compared to bubble-jet nozzles that the coating material is not heated. This may be particularly useful, for example, if the coating material is temperature-sensitive, for example because the action of heat initiates polymerization. All these types of nozzles can be used to realize a drop-on-demand technique for the coatings which are to be applied, in which in each case a predetermined quantity of coating material is applied by the nozzle in response to a control signal.

Moreover, the step of applying a liquid coating material may comprise the step of opening a valve, such as in particular a piezo valve and/or an electromagnetically controlled valve. A valve control of this type is advantageous in particular if relatively large quantities of coating material are to be applied, for example in the case of coating operations with a high rate of advance of the surface that is to be coated, as is used, for example, when coating printed products. An embodiment of the invention of this nature is also eminently suitable for coating materials with a high and medium viscosity. The use of a superatmospheric pressure system as described above, for example with a pump device connected upstream of the nozzle, or the supply of the fluid coating material under superatmospheric pressure is also particularly advantageous in combination with a valve, such as for example a piezo valve.

The apparatus may advantageously also comprise an injection device or an injection system as is used in an identical or similar way, for example, in internal combustion engines, such as injection spark-ignition engines or diesel engines. Systems of this type generally comprise an injection nozzle with electromagnetically controlled valve. Systems of this type generally also have pump devices which supply the fuel to the nozzle under a high superatmospheric pressure. Like ink-jet or piezo-jet or bubble-jet print heads, systems of this type are very well developed, have a long service life and are inexpensive on account, inter alia, of being produced on a large industrial scale and having been developed over a long period of time.

There are scarcely any restrictions on the method in terms of the coating materials which can be used. The only precondition is that the coating materials be fluid at the processing temperature. By way of example, the step of applying a fluid coating material may also comprise the step of applying a fluid coating material which includes a thermoplastic. Thermoplastics can be applied through the nozzle, for example, in molten form, dissolved in a solvent or as a dispersion. Suitable materials for coatings which include thermoplastic include, inter alia, polyethylene, polypropylene, polyacrylate, polymethacrylate, polyacrylonitrile, polybutadiene, polyamide, polyester, polyether, polyether ketones, polyvinyl acetates, polyacetals, polyvinyl acetates, polyolefins, polycarbonate, polyether block amides, PSU, PES, PPS, PVC, PVDC, PET, PS, PTFE, PVDF, POM, polyimides, polyimide derivatives, cellulose derivatives and addition copolymers.

However, it is not only possible for polymers to be used as raw material for the coating. Rather, the coating may also be carried out by a chemical reaction, such as for example a polymerization on the surface that is to be coated. This is advantageous since in this way it is also possible, for example, to produce coatings which are otherwise insoluble, such as for example thermosetting plastics. Moreover, it is in this way possible to work without solvent. For this purpose, the step of applying a fluid coating material may advantageously comprise the step of applying a coating material which includes at least one component of a chemically reactive system. Suitable coatings of this type include, inter alia, isocyanate-crosslinking systems, polyurethane epoxy systems, acrylates, methacrylates, silicones and derivatives of one of these systems. Of course, these systems may if appropriate also be combined with one another. The advantage lies, inter alia, in the avoidance of the often short pot lives of reactive systems. This also significantly alleviates the problems of cleaning and maintenance.

This procedure can also be used, for example, to apply reactive mixtures in the desired metered quantities and to locally vary them in order to produce a positionally resolved profile of properties. For this purpose, it is also possible for a plurality of components to be mixed and reacted on the surface through the at least one nozzle. In this case, the microfine distribution of the components on the substrate allows homogenous mixing of the reactive components.

Moreover, the step of applying a fluid coating material may also comprise the step of applying a coating material which includes at least one component of a thermally crosslinkable system. Thermally crosslinkable systems as coating material are advantageous since the crosslinking can in this case be brought about in a particularly simple way by heating of the applied coating. Thermally crosslinkable systems of this type may, for example, comprise polyester-melamine, polyester-urea, epoxy systems, acrylates, methacrylates or polyester systems.

According to a particularly preferred configuration of the method according to the invention, the step of applying a fluid coating material may also comprise the step of applying a coating material which includes at least one component of a radiation-curable system.

These varnishes and coatings can be processed particularly successfully using the method according to the invention. By way of example, they can generally be applied without problems using bubble-jet or ink-jet or piezo-jet systems. The rapid curability of radiation-curable coating materials is very well suited to the possibility of the high coating speed of the method according to the invention, since it is in this way possible to achieve a very high throughput during the coating process. Radiation-curable systems of this type may, inter alia, comprise acrylates, methacrylates, polyvinyl ethers, polyesters based on maleic and fumaric acid, epoxides, styrene compounds or silicone acrylates. Of course, it is also possible for combinations of the abovementioned systems to be used as radiation-curable systems.

Furthermore, the method may particularly advantageously also comprise the step of solidifying the fluid coating material on the surface. The solidification of the applied coating may, for example, comprise the step of drying the coating material. In the case of dissolved coating material, for example in the case of dissolved plastics, the solidification is achieved by evaporating the solvent. The drying can in this case be effected by simple thermal means. However, vacuum drying or drying by means of suitable drying means is also suitable and may be advantageous in the case of temperature-sensitive coatings. Moreover, in the case of thermally crosslinkable systems, the drying or the evaporation of solvent and the crosslinking can be carried out in a single working step.

Furthermore, the step of solidifying the fluid coating material on the surface may also comprise the step of radiation curing of a suitable coating material. Radiation curing and drying may also advantageously be combined with one another for the purposes of solidification.

The solidification may also be realized by a chemical reaction of constituents of the applied coating. By way of example, components of the coating may react with one another through polymerization and/or crosslinking. The crosslinking may in this case also be initiated by thermal means.

Moreover, solidification of the coating can be effected by reacting the coating material with a prior coating on the surface. By way of example, in the case of a multi-component system, the surface may for this purpose be provided with a prior coating which includes a component of the system. Then, a coating material which includes a further component of the multi-component system is applied through the at least one nozzle. The components come into contact on the surface and react with one another to form a multi-component plastic. In the same way, it is also possible for the coating applied through the at least one nozzle to react with a subsequent coating, for example as a result of a subsequent curtain coating using a coating material which includes a further component of a multi-component system.

According to another advantageous configuration of the method according to the invention, the metering head has at least one first nozzle and at least one second nozzle, and the step of applying a fluid coating material to the surface through the nozzle in response to a control signal generated by a computer comprises the step of applying a first coating material through the at least one first nozzle and a second coating material through the at least one second nozzle. By way of example, the first and second coating materials may each include components of a multi-component system. In this way, the components are brought into contact on the surface that is to be coated, and as a result polymerization or crosslinking can be initiated. Moreover, this variant of the method can also be used to apply multilayer systems in a single processing step. On account of the possibility of application with punctiform accuracy, it is also possible for various coatings to be applied in patterned form next to one another and/or such that they are interlinked with one another.

Moreover, the method according to the invention can be used to produce printing forms. Printing forms generally used for printing presses are cylindrical printing rollers or, for example in offset printing, metal sheets which are secured to printing rollers and include the printing form. However, it is generally complex to produce and replace the printing forms. However, the accurately patterned coatings which can be produced by the method according to the invention can be used to produce printing forms by the application of patterned coatings directly and without any intermediate steps. Accordingly, in a refinement of the method, the step of applying a fluid coating material to the surface through the nozzle in response to a control signal generated by a computer advantageously comprises the step of applying an image to a printing form. Depending on the type and structure of the coating material, the applied coating can be used, inter alia, for relief, gravure, doctor-blade or offset printing.

The possibility of producing multi-component systems in situ and mixing and reacting the components in any desired ratio on the surface that is to be coated can be used, for example, to apply the image to printing forms directly in the printing press, in which case it is possible to apply both two-dimensional structures, for example by positionally resolved different chemical properties of the coating, and three-dimensional positionally resolved structures of different layer thicknesses by positionally resolved thick-film application. This makes it possible, for example, to produce printing forms for offset and/or flexographic printing.

It is in this way also possible to apply different types of coatings in a positionally resolved manner next to or above one another for decorative coatings. By way of example, it is possible for structures with a gloss and matt effect to be applied next to one another.

The movement of the base along the surface that is to be coated relative to the metering head and/or the movement of the metering head relative to the surface of the base may advantageously comprise the step of advancing the base along a first direction or feed direction. In this case, a suitable device advances the base along the first direction through the coating apparatus and thereby moves it past the at least one nozzle. It is advantageous for this advancing movement also to be computer-controlled or to be recorded with computer assistance, so that the coating position, i.e. the point on the surface which lies opposite the nozzle, is known during the computer-assisted actuation.

The processing rate is not in principle subject to any restriction, apart from physical limits resulting from drying or curing and the applicability of the coating material. The base can be moved at a rate of up to 2000 meters per minute, preferably at a rate of up to 500 meters per minute, relative to the metering head along the feed direction. According to one embodiment of the invention, feed rates of 150 meters per minute or more are achieved. In particular in roll offset printing, feed rates of 300 meters per minute or more are in many cases used, and this can be achieved with the method according to the invention, which means that the invention, inter alia, can also be implemented successfully in roll offset printing presses. The choice of the appropriate feed rate is in this context determined primarily by the positioning resolution which is to be achieved, the layer thickness, the drop size, which is imposed inter alia by the nozzle, and the actuation frequency with which the nozzle is actuated by the computer. The type of coating material, such as for example its viscosity, may also influence the rate of feed in the feed direction and therefore the processing time or throughput. Conversely, to achieve higher feed rates, it is possible not only to make design changes but also to adapt the coating material.

Moreover, it is expedient if the metering head is moved along a second direction which is transverse or not parallel, preferably substantially perpendicular, to the first direction. By combining these two movements, it is possible, in a simple way and with a limited width of the metering head or a limited number of nozzles, to coat even bases of different widths in patterned form over their entire surface. Of course, it is possible for a wider substrate also to be covered by a larger number of nozzles arranged next to one another.

Furthermore, it may be advantageous also to allow the nozzle head to move perpendicular to the surface which is to be coated, since this also allows three-dimensional substrates to be coated.

Ultimately, however, there are no limits imposed on the movement of the metering head, which means that it is possible to use the metering head in multi-axis systems. This also allows three-dimensional bodies to be coated or even shaped. Furthermore, even material in cable, wire or hose material can be coated. In this case, the metering head is moved on a circular orbit or, by way of example, a plurality of nozzles are arranged in a ring form. Compared to the extrusion technique which is normally used to coat this geometry, the advantage of the method according to the invention consists, inter alia, in the fact that it is possible to apply reactive multi-component mixtures which only react on the substrate.

Moreover, the base which is to be coated may be in web form and, if the material is sufficiently flexible, can be wound up onto a reel. The step of moving the base along the surface that is to be coated relative to the metering head and/or moving the metering head relative to this surface of the base may then advantageously comprise the step of unwinding the material from the reel. A method configured in this way can be used for a wide range of industrial applications. Examples of suitable web-like bases include paper or cardboard webs, glass webs, textiles and fabrics, and also plastic films and metal foils. The method can also be used to coat composite materials, such as laminate films, and also to produce them.

Moreover, the step of moving the base along the surface that is to be coated relative to the metering head may advantageously comprise the step of winding up the base onto a reel. Combining this step with unwinding the base moreover makes it possible to achieve a reel-to-reel production process.

To produce more complex coatings, the method may also be configured in such a way that the steps of moving a base having a surface that is to be coated along this surface relative to the metering head and/or moving the metering head relative to a surface of a base that is to be coated and of applying a fluid coating material to the surface through the nozzle in response to a control signal generated by a computer are carried out more than once. In this way, it is possible to produce both thick coatings and also in particular multi-layer structures. It is also possible for different coating materials to be used for the individual layers during the multiple coating sequence.

The method according to the invention can be used to apply not only varnishes, organic coatings or polymer coatings, but rather may also be configured in such a way that patterned coating with metallic regions is made possible. This can be used, for example, in the production of printed circuit boards. For this purpose, the step of applying a fluid coating material comprises the step of applying a coating material which includes a seed solution, in particular an Sn(IV)-containing seed solution. The surface can then be metallized using a suitable wet-chemical process. This metallization operation is known per se from the production of printed circuit boards. The metallization may, for example, be effected by the deposition of bonding nickel followed by the deposition of copper as a conductive layer on the layer of bonding nickel. However, with the method according to the invention it is also possible for the seed solution to be applied in a very accurately metered and finely patterned form to the surface. The metallization then occurs only on those regions of the surface which have been treated with seed solution. In this context, the methods which are known from the prior art use retrospective, photolithographic patterning of a previously completely metallized surface for patterning. By contrast, therefore, the method according to the invention allows likewise patterned metallic regions to be applied in a significantly simpler way. This can also be exploited in combination with the free choice of surface geometry to apply metallic structures, for example as interconnects, to complex plastic parts, as are in widespread use, inter alia, in motor vehicle electrics as injection moldings in switches but also for housings of electronic components.

Moreover, the method may advantageously comprise the step of at least partial removal of the coating on the surface. This is particularly expedient if the coating serves as a mask. For example, this configuration of the method can also be used for patterned metallization, for example for the production of interconnects. By way of example, for this purpose a correspondingly negatively patterned polymer coating is applied, and the surface that has been coated in this way is then metallized. The metallization may, for example, be effected by sputtering or vapor deposition. Then, by removing the polymer coating applied in patterned form, the metallization is lifted off on the coated regions, while the metallization remains in place on the regions which were not previously coated (lift-off technique). These processes are normally carried out in resist technology. By contrast, in this case too, an advantage of the method according to the invention, is the elimination of the complex photoresist coating and developing steps.

This method for producing patterned metallizations on a base may also be effected for the production of multilayer circuit boards by repeating the working steps a number of times, in which case a varnish coating or plastic coating can be applied as insulator layer between each of the metallization steps.

The method according to the invention can also be used in a number of ways for the production of optical components. This means that optical structures can be defined on the base using a patterned coating which comprises transparent coating materials. By way of example, the combination of positionally resolved coating and the use of a plurality of coating materials can advantageously be deployed to define optical components in the coating. For this purpose, a region in the layer has to have a different refractive index than adjacent regions. Accordingly, in a refinement of the invention of this nature, the step of applying a fluid coating material to the surface through the nozzle in response to a control signal generated by a computer comprises the step of applying coating material to at least one region which has a different refractive index than adjacent regions or even does not transmit the wavelengths used. The use of multi-component reactive mixtures can also be effected by deliberate replacement of one or more individual components which influence the refractive index. In this way it is also possible to produce a refractive index gradient by controlled production of a concentration gradient during this replacement of one or more components with a differing refractive index.

In addition to waveguides as optical components, it is, of course, in this way also possible to produce other optical components, such as for example gratings. The method according to the invention may also particularly advantageously be used to produce more complex multi-component optical components, such as for example arrayed waveguide gratings, splitters or combiners, or also Mach-Zehnder interferometers.

The vertical position of the optical waveguide can also be controlled in a targeted way by multilayer coating or coating in thick films. This results in numerous applications in the field of optical waveguides, such as for example the linking of planar waveguide structures to three-dimensionally shaped waveguides, such as for example glass fibers or other optical components, or alternatively the production of optical functional layers in multi-layer circuit boards through the application of optically functionalized intermediate layers, the optical connection of components on conventional printed circuits in an additional layer. On account of the production method in which it is possible also to permit a limited amount of diffusion between adjacent, chemically different regions until the layer cures, it is also possible to generate a refractive index gradient, with the result that it is possible to have a controlled influence on the conduction of light in the optical waveguides.

The production of different refractive indices in optically transparent layers can also be exploited to produce optical structures in the varnish layers. As a result, a product can be provided with a forgery-proof marking or it is possible for patterns to be applied for automatic recording by means of optical readers. Furthermore, the method may advantageously comprise the step of orienting the base or recording the position and angle of the base relative to the metering head. Orienting the base or the coating pattern onto the base ensures the correct positioning of the coating pattern on the base. The orientation may in this case be monitored mechanically or optically. The orientation relative to the metering head encompasses not only an orientation of the base relative to a metering head held in a fixed position, but rather may particularly advantageously also be implemented by adapting the position of the metering head or by computer-aided orientation of the coating pattern produced by the metering head. The orientation of the coating pattern relative to the base that is to be coated, for example by recording the position and orientation of each individual substrate that is to be coated, makes it possible to position the coating pattern such that it is matched to the shape and position of the substrate with computer assistance. The recording may be effected optically, for example, by means of a three-point laser. This brings with it another particular advantage of this configuration of the method according to the invention, since the coating pattern is oriented onto the substrate so quickly that it is possible to dispense with exact positioning, which is often mechanically complex, or with retrospective orientation of the substrate that is to be coated, which is almost impossible to implement in particular in the case of large and/or heavy substrates.

It is also within the scope of the invention to provide a coating apparatus which is particularly suitable for carrying out the method according to the invention as described above. Accordingly, an apparatus for applying coatings comprises at least one coating unit, which comprises at least one metering head that has at least one nozzle which can be controlled in response to a control signal, and a device for moving a base having a surface that is to be coated along this surface relative to the metering head and/or for moving the metering head relative to a surface of a base that is to be coated. The device for moving the base relative to the metering head and/or the metering head relative to the surface that is to be coated may, of course, also be designed to execute a movement of the metering head in all three spatial directions, for example for the coating of three-dimensional bodies. In the case of planar surfaces, the substrate may also remain stationary, with the metering head being moved along two axes that are substantially perpendicular to one another.

The metering head is in this case preferably arranged in such a way that the at least one nozzle does not touch the base that is to be coated. This advantageously allows contactless coating of the base.

The device for moving a base having a surface that is to be coated along this surface relative to the metering head and/or for moving the metering head relative to a surface of a base that is to be coated may advantageously also comprise a conveyor device for conveying the base along a first direction. The conveyor device can be used to move the bases that are to be coated in the apparatus and in particular to convey them through the apparatus, allowing a continuous coating process.

Furthermore, the coating unit may also comprise a device for moving the metering head along a second direction that is substantially perpendicular to the first direction. This allows the at least one nozzle to be positioned at any point on the surface which is to be coated in order for the coating to be applied there in metered form. On account of the fact that this device for moving along a direction that is substantially perpendicular to the conveying direction of the base is accommodated in the coating unit, it is also easy for the coating unit to be integrated in existing installations, such as for example printing or painting installations, since such installations in many cases already have conveyor devices.

Furthermore, for the continuous coating of three-dimensional substrates it may be advantageous for the metering head to be mounted in such a way that a movement in a third dimension and if appropriate even a rotary motion of the head is also possible, in order to allow all locations on a three-dimensional body to be coated.

The at least one nozzle may particularly advantageously comprise a bubble-jet nozzle and/or an ink-jet or piezo-jet nozzle. These types of nozzles, as well as the corresponding metering heads, are used in large numbers in printers, making these nozzles correspondingly inexpensive. Moreover, the use of nozzles of this type also makes it possible to utilize the high level of positional accuracy and metering accuracy which can be achieved in ink-jet printing technology for the application of coating materials, such as for example plastic coatings or varnishes. Furthermore, the at least one nozzle may be connected to a valve, in particular to a piezo valve or an electromagnetically controlled valve, or may be actuated by the valve. The valve may in particular be designed to be controllable, in order to allow computer-assisted metering of the coating material through control of the valve.

To allow the coating operations to be carried out with a high throughput while at the same time taking up the minimum possible amount of space in the coating installation, the apparatus may moreover have a device for solidifying the coated surface of the base, so that short drying sections are sufficient in the apparatus. In this case, the coated base can be removed immediately or processed further after the end of coating and solidification without any possibility of damage to a coating which has otherwise not yet been completely solidified or cured.

The device for solidifying the coated surface of the base may, for example, comprise a drying device, such as an infrared and/or heat drying device. Moreover, a UV or electron radiation curing device is also advantageous for the application of radiation-curable coatings, such as for example UV- or electron-curable varnishes.

Finally, the apparatus may comprise a device for orienting the base. By means of this device, the base is oriented accurately before and/or during the coating operation, so that the nozzle of the metering head accordingly coats the same position accurately and reproducibly without any adjustment being required.

Moreover, the apparatus may have a device for measuring the position of the base. This makes it possible, for example to check and recorrect the position of the base or the metering head or also, when using a plurality of nozzles in an array, the orientation of the coating pattern onto the base, which therefore does not have to be positioned specially. The position may in this case preferably be determined optically or mechanically. In particular a combination with a device for orienting the base or the metering head is advantageous in this context. It is in this way possible to check and correct the position of the coating image relative to the base before and during the coating operation.

Furthermore, it is within the scope of the invention to provide a base which has been coated by means of the method according to the invention and/or the apparatus according to the invention. To correspond to a multiple coating operation, a base which has been coated in this way may also have a plurality of individual layers. The coating may also have regions of different materials as a result of the application of various materials. In the case of a multiple coating operation, these regions may also be located in different individual layers.

By applying transparent coating materials, it is possible, as described above, also to define optical components, such as for example waveguides, in the coating. In particular, by patterned application it is also possible to produce multicomponent optical elements, such as for example gratings and/or arrayed-waveguide gratings and/or Mach-Zehnder interferometers by means of the coating.

BRIEF DESCRIPTION OF THE SEVERAL VIEWS OF THE DRAWINGS

The invention is explained in more detail below on the basis of preferred embodiments and with reference to the appended drawings, in which identical reference symbols denote identical or similar components and in which.

DETAILED DESCRIPTION OF THE INVENTION

Figure 1:
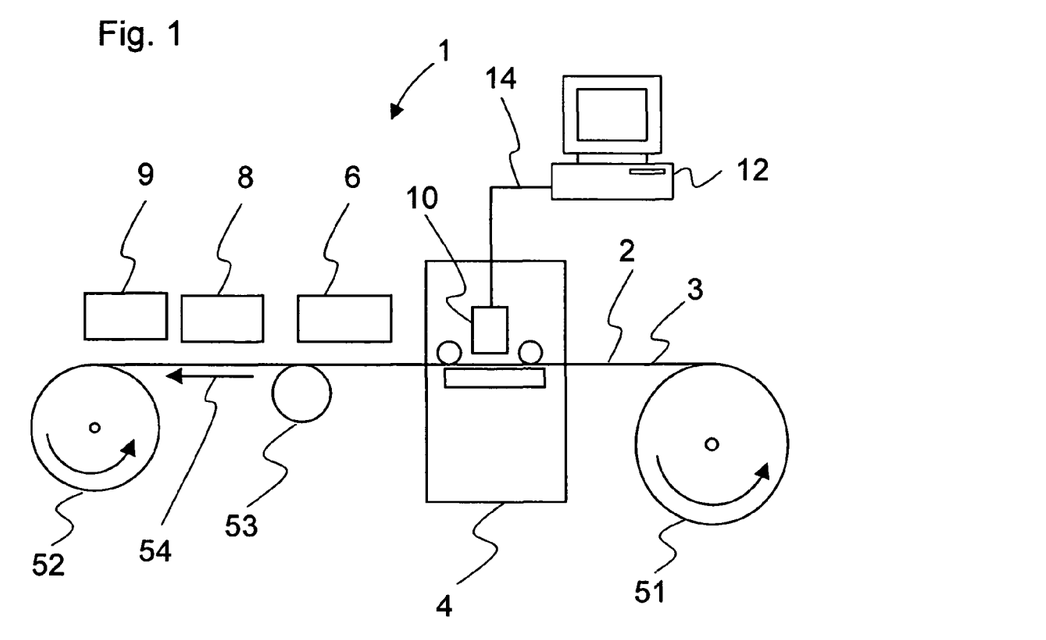
FIG. 1 shows a first embodiment of an apparatus according to the invention for the coating of bases in web form.

FIG. 1 shows a diagrammatic view of a first embodiment of an apparatus according to the invention for the application of coatings, which is denoted overall by 1. The embodiment of the apparatus 1 which is illustrated in FIG. 1 is used to coat a base 2 in strip form which is wound up on a reel 51. The base 2 may, for example, comprise paper, cardboard, textiles or a film or foil material which can be wound up accordingly. The reel 51 is part of a conveyor device which conveys the base 2 through the apparatus 1. After it has been coated, the base is wound up on a further reel 52, which is likewise part of the conveyor device. The conveyor device also comprises one or more rollers 53 which may, for example, also be designed as vacuum conveyor rollers.

The base 2 is passed through a coating unit 4 along a first direction 54, indicated by an arrow, by means of the conveyor device 51, 52 and 53. The coating unit 4 comprises a metering head 10 which has nozzles for the application of the coating material. The metering head, or the nozzles of the metering head, can be controlled, for example, in response to computer-generated signals. For this purpose, the metering head 10 is connected to a computer 12 via a suitable interface 14. The interface used in this context may, for example, be a printer interface. The computer generates corresponding control signals for actuation of the nozzles of the metering head 10 and transmits these signals to the metering head via the interface 10. Coating material is then applied in punctiform fashion from the nozzles in response to the control signal. The coating material may, for example, comprise a varnish, so that the apparatus according to the invention can be used to apply varnish over the entire surface or to locally limited parts of the surface 3 of the strip-like base that is to be coated.

The coating unit 4 may, moreover, comprise a device for moving the metering head along a second direction that is substantially perpendicular to the first direction. This allows the metering head to be displaced and positioned in a direction perpendicular to the plane of the drawing, so that the entire surface of the base 2 in strip form can be covered.

After it has left the coating unit 4, the base 2 in strip form is guided past a drying unit 6 which at least partially evaporates solvents from the applied coating material by heating the applied coating, in particular by means of hot air or thermal radiation.

This embodiment of the apparatus 1 also has a radiation curing unit 8, past which the coated base 2 is likewise guided. The radiation curing unit 8 radiates, for example, ultraviolet light or electron beams onto the coating. If the base 2 was coated, for example, with a UV-curable varnish in the coating unit 4, the varnish is cured while the base is being guided past the unit 8. The UV-curable varnish may in this case, for example, be based on acrylates, methacrylates, polyvinyl ether, polyesters based on maleic acid or fumaric acid, epoxy resins, styrene compounds, silicone acrylates or mixtures thereof.

The combination of drying and curing produces a solid coating which, moreover, is fully cured before the strip-like base 2 is wound up onto the reel 52, which means that it is no longer possible for individual layers to stick together on the reel 52. Finally, cooling-by means of a cooling unit 9 can also be carried out before the base 2 is wound up.

Figure 2:
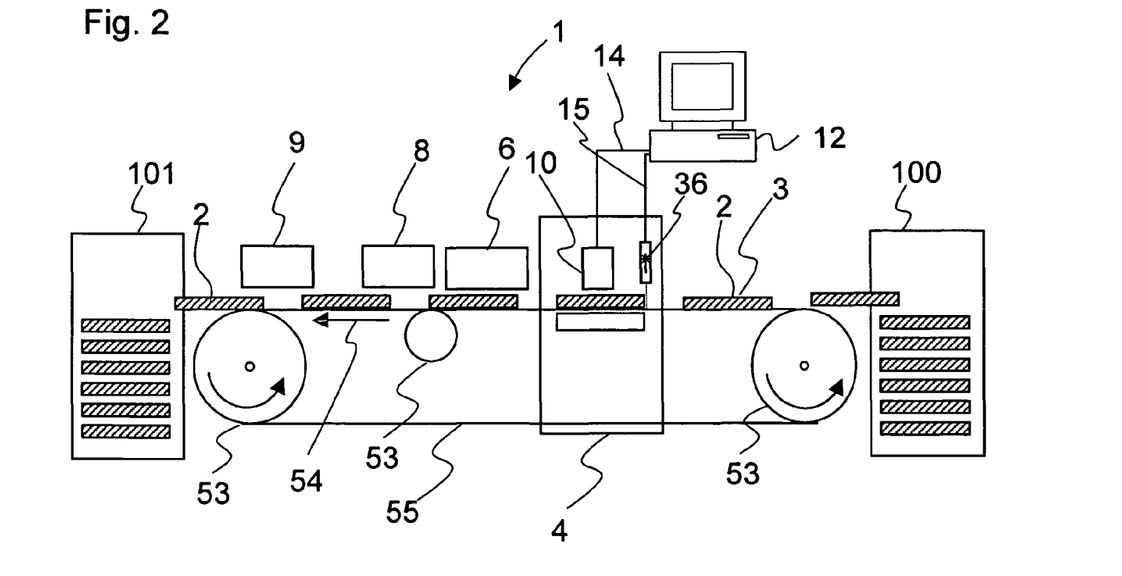
FIG. 2 shows an embodiment of an apparatus according to the invention for the coating of individual substrates.

FIG. 2 diagrammatically depicts an embodiment of an apparatus according to the invention for the coating of individual substrates. For this purpose, the apparatus has a feed device 100 for supplying bases in the form of individual substrates. The feed device 100 places the substrates on a conveyor belt 55 which is guided and moved by rollers 53. The apparatus 1, in particular the coating unit 4 of the apparatus 1, may have a position-determining device 36 for determining the position of the bases 2 on the conveyor belt 55. By way of example, the position-determining device 36 can determine the position of the leading edge of the individual substrates by means of a suitable light barrier. The position-determining device 36 may be connected to the computer 12 by means of an interface 15 in order for position data or corresponding signals to be transmitted to the computer 12. The position data can then be taken into account by the program for controlling the metering head 10, in order to obtain an accurate orientation of the applied, patterned coating.

The surfaces of the bases are then treated as described with reference to FIG. 1. After curing and drying, the fully coated bases 2 are removed from the conveyor belt and stacked by a removal device 101 for individual substrates.

The feed rate which can be achieved with an embodiment as illustrated, for example, with reference to FIG. 1 or 2 depends on the positional resolution of the coating application, on the coating thickness which is to be achieved, on the drop quantity and on the actuation frequency of the nozzles of the metering head. If the metering head is not displaced transversely with respect to the first direction, the resolution is determined, for example, by the nozzle spacing. At a resolution of 100 dpi and a coating thickness of 5 μm, a drop quantity of 350 picoliters and an actuation frequency of 5 kHz, for example, it is possible to reach a feed rate of 100 meters per minute. Of course, depending on the abovementioned parameters, it is also possible to achieve significantly higher processing rates. For example, it is typically possible to reach feed rates of 150 meters per minute or above.

However, it is also possible, for example in the event of a corresponding increase in the actuation frequency or the drop quantity or by the use of suitable metering heads, to achieve a feed rate of 500 meters per minute or up to 2000 meters per minute. According to one embodiment of the invention, feed rates of 150 meters per minute or more are reached. In particular, feed rates of 300 meters per minute or more can preferably also be achieved, which means that the apparatuses described with reference to FIG. 1 or 2 may also, for example, comprise offset printing presses. The apparatus illustrated in FIG. 1 may in particular comprise a roll offset printing press, in which feed rates of 300 meters per minute or above are customary.

Figure 3:
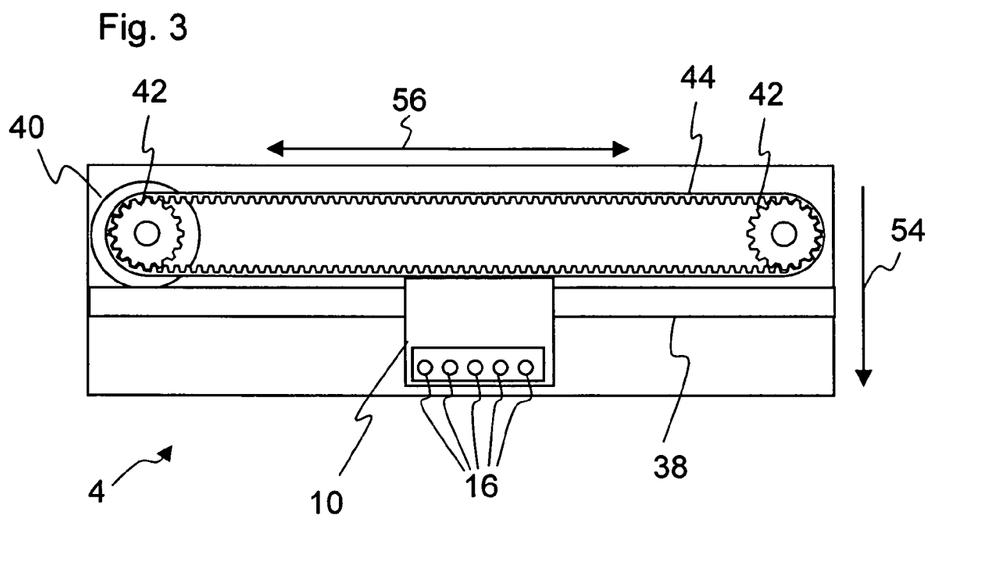
FIG. 3 shows a diagrammatic plan view of a coating unit, FIG. 4 diagrammatically depicts the production of a patterned coating on a surface of a base that is to be coated.

FIG. 3 shows a diagrammatic plan view of an embodiment of a coating unit 4. The coating unit 4 may, for example, be integrated as a module in a coating installation or a printing press, so that the bases which are to be coated are guided past the coating unit 4 along the first direction 54. This embodiment of the coating unit 4 has a metering head 10 which can move along a direction 56 that is substantially perpendicular to the direction 54. For this purpose, the metering head 10 is held on a guide rail 38 in such a manner that it can move along the direction 56. Moreover, the metering head 10 is secured to a toothed belt 44 which runs over gearwheels 42. One of the gearwheels 42 is connected to a stepper motor 40, which accordingly drives the toothed belt 44 via the gearwheel 42 and thereby moves the metering head along the guide rail 38. Moreover, the coating unit 4 may have electronics for controlling the metering head 10 and for driving the stepper motor. Furthermore, the coating unit 4, as diagrammatically depicted with reference to FIGS. 1 and 2, may have an interface for connection to a computer for controlling the unit 4.

Figure 4:
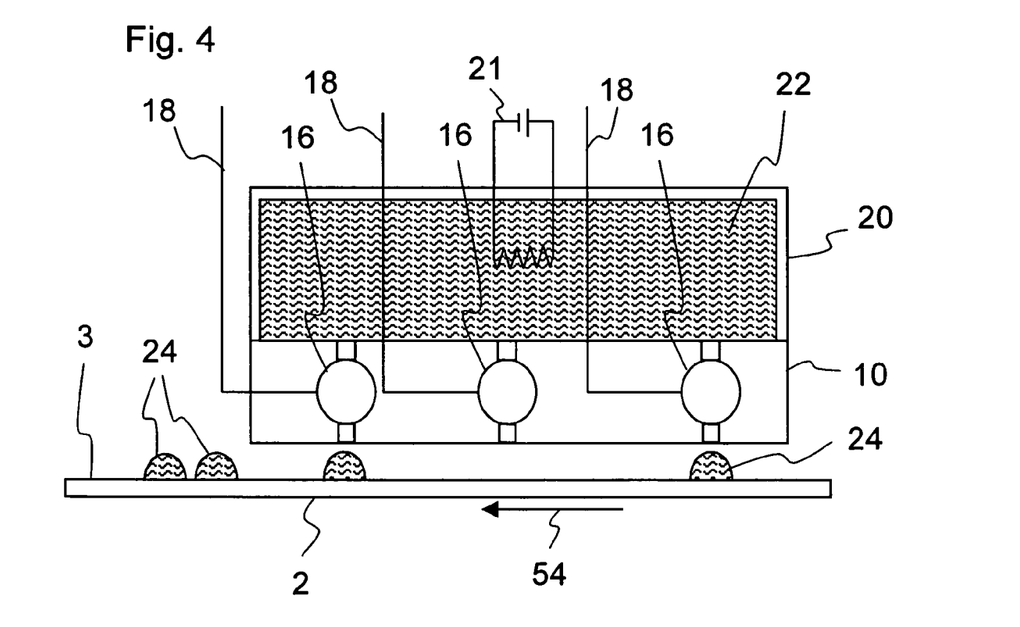

The following text refers to FIG. 4, which diagrammatically depicts the production of a coating patterned in positionally resolved form on a surface 3 of a base 2 that is to be coated. The base 2 is guided past the metering head 10 along a first direction 54. The metering head 10 has actuable nozzles 16 which are in each case connected to the interface via supply conductors 18. The connection may be effected directly or via a circuit arrangement. The nozzles may, for example, be bubble-jet nozzles or ink-jet or piezo-jet nozzles. The control signals transmitted via the interface are transformed into corresponding supply line signals. The nozzles 16 are connected to a reservoir 20 containing the coating material 22. Moreover, the apparatus may have a preheating device 21 which preheats the fluid coating material 22 contained in the reservoir 20 in order, for example, to reduce its viscosity. The fluid coating material is preferably either heated in such a way that its viscosity is from 8 to 100 mPa·s, preferably 8 to 50 mPa·s, particularly preferably 8 to 25 mPa·s, or the composition of the coating material is selected accordingly so as to have a viscosity of this nature. It is likewise possible to reduce the viscosity of a highly viscous coating material by heating and suitable additions in order to facilitate the coating application.

If a supply conductor signal is applied to a nozzle via the supply conductor, for example in the case of a bubble-jet nozzle a region of the nozzle is heated, so that coating material or solvent of the coating material evaporates and a drop 24 is applied from the nozzle to the surface 3 of the base 2 that is to be coated as a result of the vapor pressure. Movement of the base in the direction 54, as well as the instant at which a control signal or a supply conductor signal is applied to the nozzle, therefore defines the position of a drop 24 of coating material in the direction 54 along the surface 3. Movement of the metering head 10 in a direction that is perpendicular to the direction 54 also determines the position of a drop in this direction, so that coatings which are patterned in a positionally resolved form can be produced from the large number of applied drops 24 in accordance with the drop-on-demand principle. Depending on the composition of the coating material, the individual drops can then be solidified, for example, by UV curing or thermal crosslinking, in order to produce a solid and durable coating. The drops 24 may in particular be placed so close together that a continuous film is formed from the drops.

Figure 5:
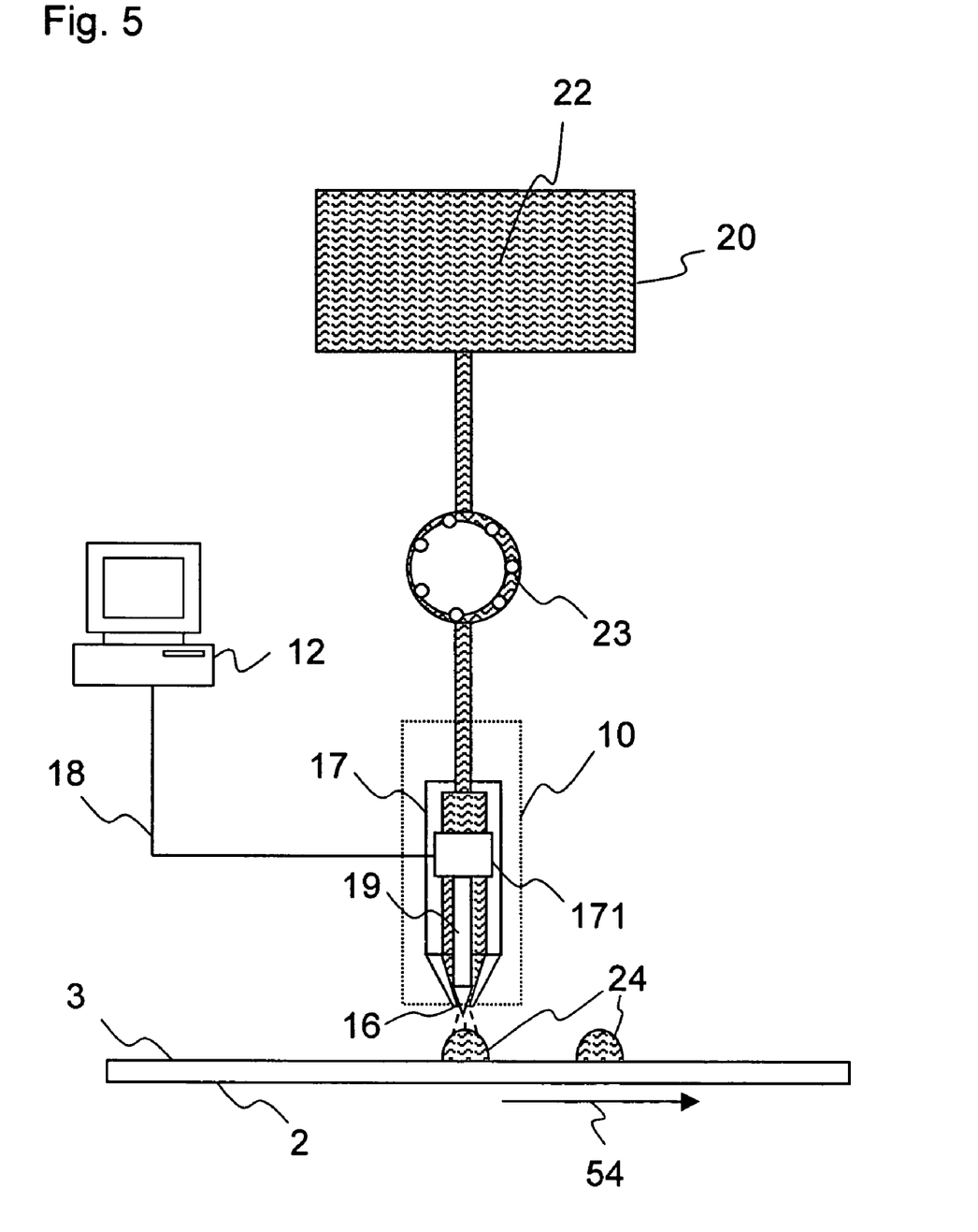
FIG. 5 shows parts of a further embodiment of the apparatus according to the invention.

FIG. 5 shows part of a further embodiment of an apparatus according to the invention. In this embodiment, the metering head 10 comprises a nozzle 16 which is actuated by a piezoelectric or electromagnetically controlled valve 17. For this purpose, the valve 17 comprises an electromagnetic or piezoelectric actuator 171 which is connected to a nozzle needle 19 and is also connected to a computer 12 via a supply conductor 18. Suitable electronics (not shown) which convert the control signals generated by the computer 12 may be connected between the computer 12 and the valve.

The fluid coating material 22 is removed from a reservoir 20 by a pump device 23 and fed to the nozzle under superatmospheric pressure. An example of a suitable pump device 23 is a roller cell pump or a vane cell pump, as are used, for example, in fuel injection systems for internal combustion engines. The valve 17 may also comprise an injection valve for injecting fuel into internal combustion engines. These components are distinguished by a high long-term stability and can operate at high superatmospheric pressures or generate high pressures. Systems of this type are particularly suitable for the processing of relatively large quantities of coating material and relatively large coating thicknesses. Even coating materials with a high viscosity can be processed easily.

In addition to a valve with nozzle needle as illustrated in FIG. 5, numerous other types of closure are also possible. By way of example, the valve may have a flap which can be controlled or actuated by control signals or a corresponding slide or a device for pressing or bending over a tube or hose in order to control the coating application.

Figure 6A:
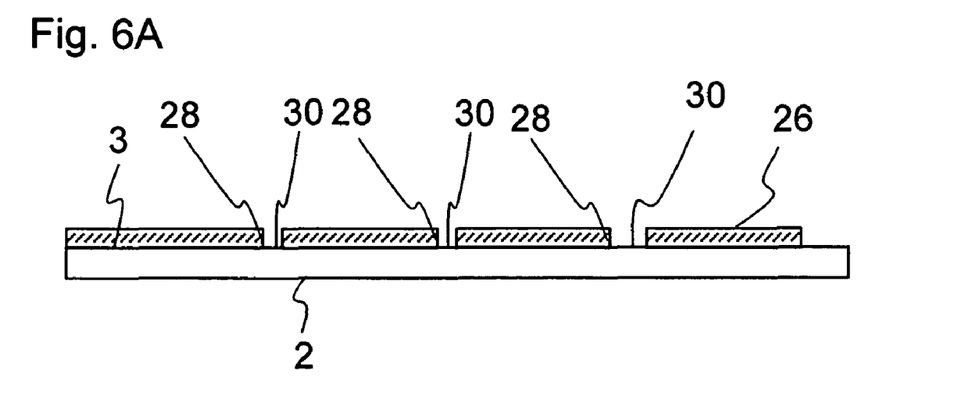
FIGS. 6A-6C show method steps involved in the production of metallized regions on a base.
Figure 6B:
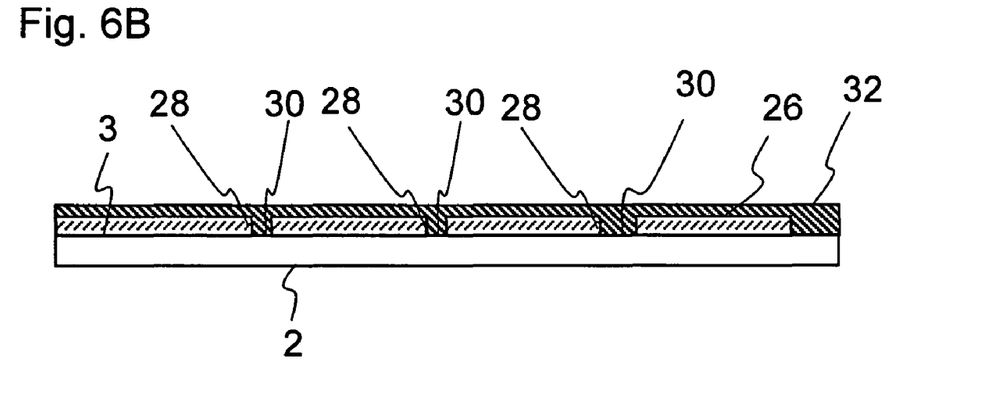
Figure 6C:
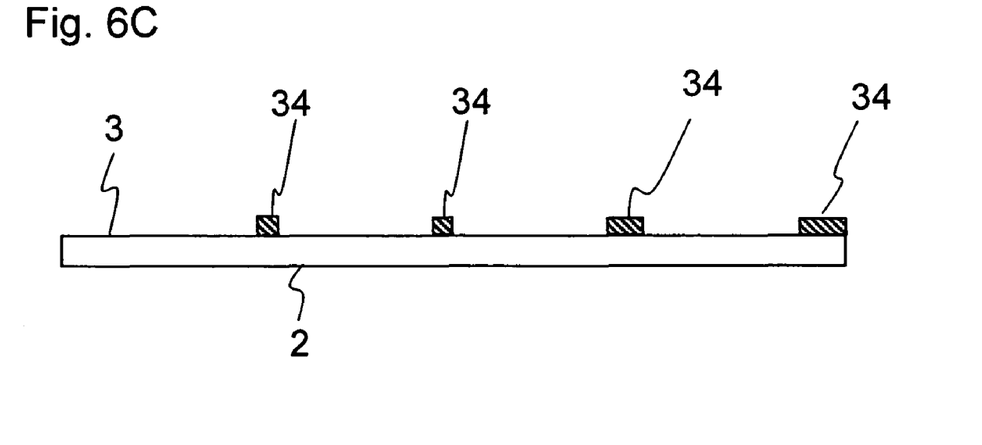

The following text refers to FIGS. 6A to 6C, which show method steps involved in the production of metallized regions on a base using the lift-off technique.

FIG. 6A, first of all, shows a base 2 which has been coated in accordance with the invention and has a fully cured coating 26 on one side 3. The coating may have been applied as has been described with reference to FIG. 4. The coating 26 is patterned in such a manner that it has trench structures 28. The trench structures 28 leave regions 30 of the coated surface clear.

FIG. 6B shows the coated base 2 after the application of a metallic layer 32. The layer does not have to be applied in patterned form. Rather, the entire surface of the base can be homogenously coated, it being possible for the coating to be effected, for example, by vapor deposition or sputtering or by wet-chemical means. In addition to the coated regions of the surface, the uncovered regions 30 of the surface are also metallically coated by the uniform metallization.

Then, the patterned coating 26 can be removed again. This can be effected, for example, by dissolving it in a suitable solvent. The removal of the layer 26 also causes the metallization of the coated regions of the surface to be lifted off or removed with it. FIG. 6C shows the base after this method step. Accordingly, metallized regions 34 remain on the base at the location of what were originally the uncovered regions 30 on the surface 3. The metallized regions 34 may then form interconnects in a suitable way, which means that this variant of the method is particularly suitable for the patterning of circuit boards.

Figure 7A:
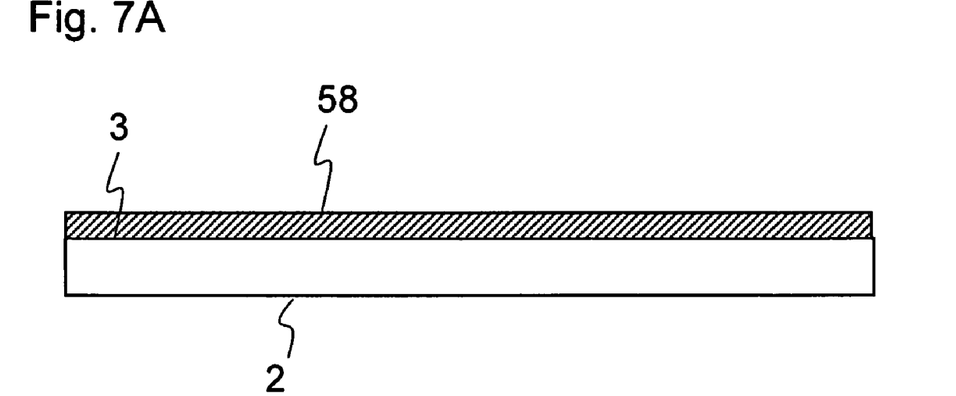
FIGS. 7A-7C show method steps involved in the production of a multilayer coating with waveguide structures, and FIG. 8 diagrammatically depicts an apparatus for the production of printing forms, FIG. 9 diagrammatically depicts an exemplary embodiment of a coating device, FIGS. 10A-10D diagrammatically depict various arrangements of metering heads.
Figure 7B:
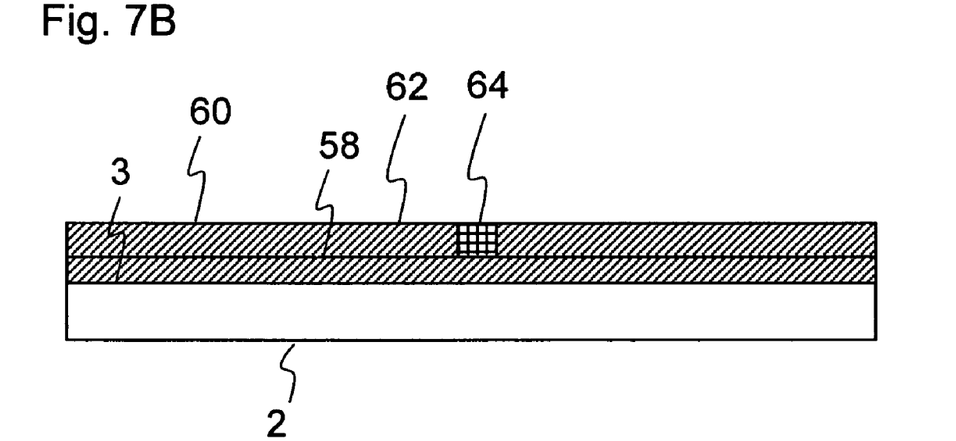
Figure 7C:
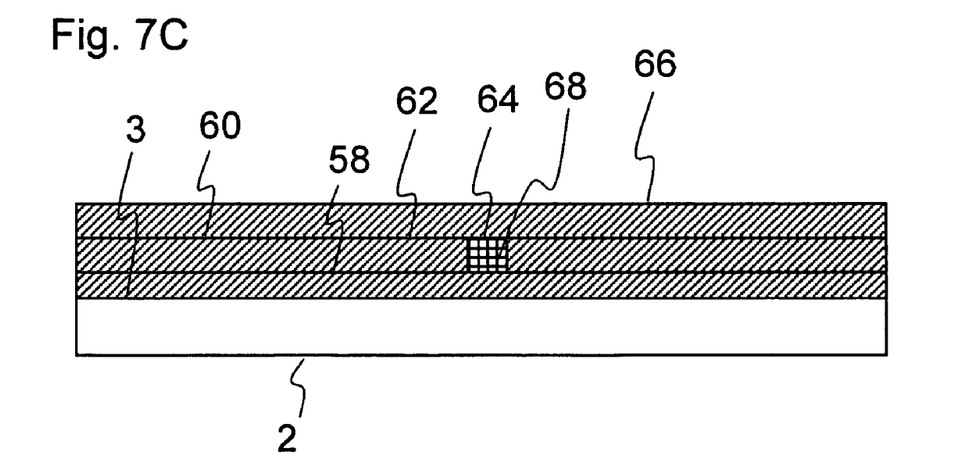

FIGS. 7A to 7C illustrate, by way of example, method steps involved in the production of a multilayer coating with waveguide structure on the basis of diagrammatic cross-sectional views. As shown on the basis of FIG. 7A, first of all a first individual layer 58 of a first material is applied to the surface 3 of a suitable base 2 that is to be coated.

FIG. 7B shows the base 2 after a further coating operation in which a second layer 62 has been applied to the first layer 60. The layer 62 has regions 62 made from a first material and a region 64 made from a further material. In order subsequently to define a waveguide, the region 64 has an elongate structure.

To produce this second individual layer, the method according to the invention was implemented by moving the base relative to the metering head and/or the metering head relative to the base and applying a fluid coating material to the surface through one or more nozzles of the metering head in response to control signals generated by a computer. The regions 62 and 64, which comprise different coating materials, were produced by applying a first coating material through at least one first nozzle and a second coating material through at least one second nozzle of the metering head.

Finally, as shown with reference to FIG. 7C, the coating produced in this way is covered with a third individual layer 66. The coating materials used for the multilayer coating are selected in such a way that the coating material of the region 64 has a different refractive index than the adjoining regions. To ensure that the region 64 defines a waveguide structure 68, this region preferably has a lower refractive index than the coating materials of the first and third individual layers and of the regions 62. Of course, application by means of computer-controlled nozzles of this nature can also be used to integrate other structures, in particular including other optical components, such as for example optical gratings, in the coating. Of course, it is also possible to achieve regions of different refractive indices by locally varying one or more components of a multi-component system.

Figure 8:
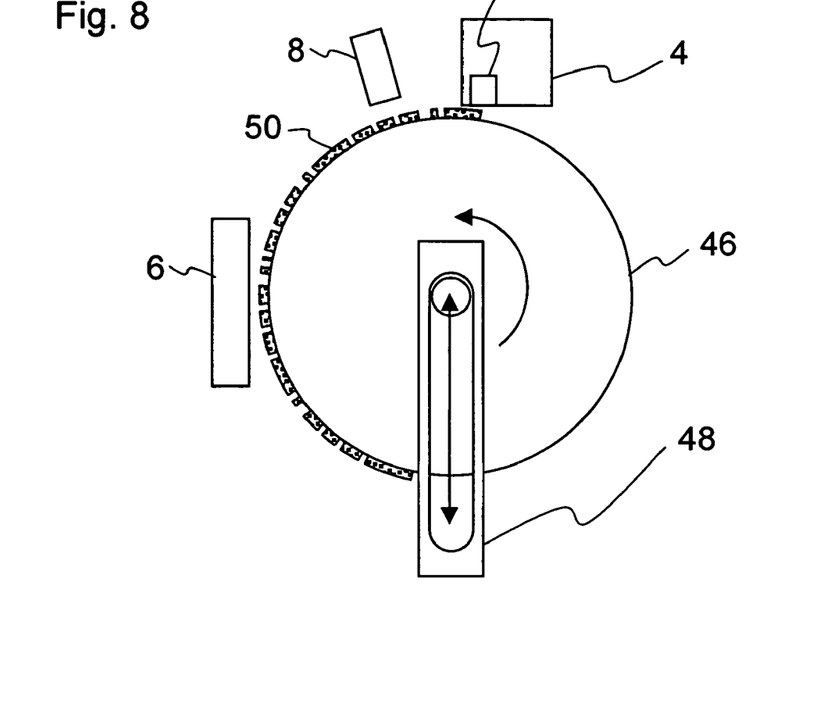

FIG. 8 illustrates a further application of the invention. FIG. 8 diagrammatically depicts an apparatus for producing printing forms. This apparatus may in particular be integrated directly in printing presses, making it possible to dispense with the complex production and exchanging of the printing forms. The apparatus is formed, for example, for the application of an image to a printing cylinder 46. In this case, the printing cylinder constitutes the base that is to be coated, and its lateral surface constitutes the surface of the base that is to be coated. To apply an areal coating, the printing cylinder is rotated during the coating process.

The apparatus, similarly to the embodiments explained above, has a coating unit 4. The coating unit 4 applies a coating 50 to the lateral surface of the printing cylinder, and the coating is patterned in such a way as to have the intended image of the printing form. The patterning may be such that the printing ink adheres to elevated regions of the coating or in recesses in the coating 50.

In addition, the apparatus may also have a UV curing unit 8 when using radiation-curable coating materials and/or a drying unit 6. If the apparatus is integrated in a printing press, the printing cylinder may, for example, be raised by a lifting apparatus from a printing position into a coating position, in which the cylinder 46 can rotate without contact, in order to be coated. In addition to the application of an image in the press, it is also possible for printing forms, preferably sleeves, to have an image applied to them outside the press and for these forms then to be fitted in the press after patterning, making the image-application process independent of the printing process in terms of time. This option may preferably be used both in offset printing and in flexographic printing, although it is not restricted to these two methods.

Figure 9:
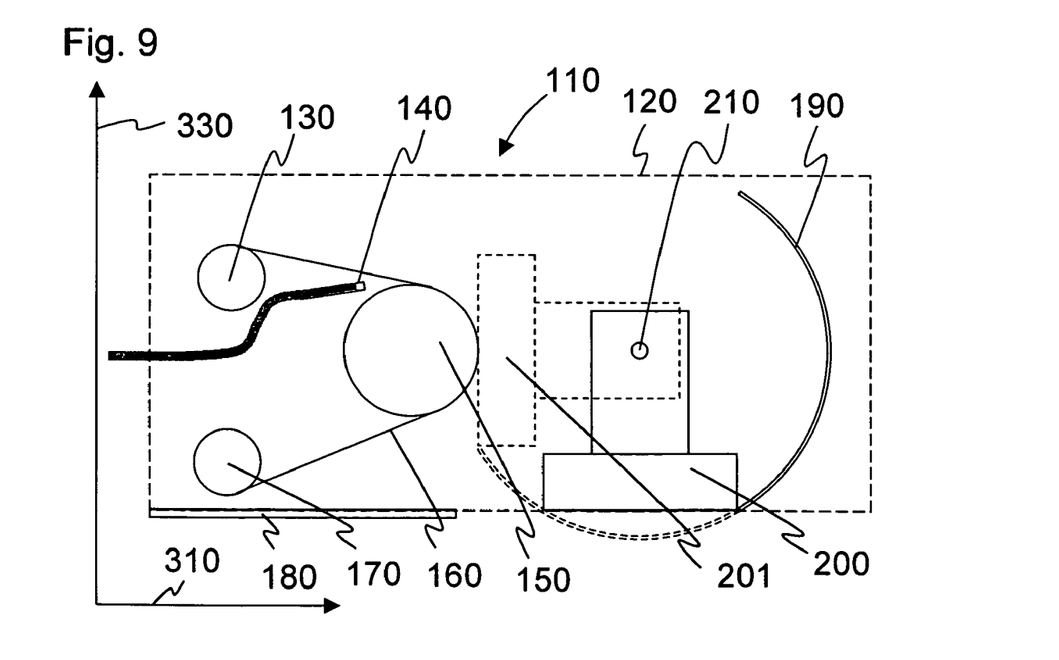

FIG. 9 diagrammatically depicts an exemplary embodiment of a coating device 110. This exemplary embodiment relates to an installation on which substrates are conveyed through beneath the coating device 110 along a first direction 310. The substrates are coated by the coating device 110.

The direction 330 runs perpendicular to the plane of planar substrates. The plane in which planar substrates are located is accordingly defined by the first direction 310 and a second direction 320, which runs perpendicular to the directions 310 and 330 and therefore perpendicular to the plane of the drawing in FIG. 9. For nonplanar substrates, for example cylindrical substrates, such as for example tubes, the coating unit is matched to the contour of the substrates, for example by means of a ring-like arrangement.

The coating device 110 comprises a coating unit 200, a cleaning unit and the electrical and electronic control components, as well as media supply and media preparation means. The coating device 110 is enclosed in a dust-tight housing 120, in the interior of which the cleaning unit is accommodated. In coating operation, only the coating unit 200 faces outward, in order to prevent the interior from being contaminated with dust, for example paper dust or printing powder. This is particularly important when using small nozzles in order to prevent the nozzles from becoming soiled or blocked.

For cleaning operation, the coating unit 200 can be rotated about an axis 210, so that it can be cleaned by the cleaning unit. A seal 190 ensures that the housing 120 remains completely closed off from the outside in a dust-tight manner during the cleaning operation. For downwardly directed coating, it is advantageous to position a collecting trough opposite the coating unit 200 to collect coating material which is released, for example, during conditioning of the nozzles. A protective plate 180 protects against substrates which are not guided correctly in the installation and could damage the coating unit 200.

The cleaning unit may, for example, comprise a feed roll 130 for lint-free cleaning cloth 160, one or more cleaning rollers 150, which press the cleaning cloth 160 uniformly onto the metering heads 250, a winding device 170 for winding up used cleaning cloth 160 and a nozzle 140 for the controlled metering of cleaning liquid.

The supply of media to the coating unit 200 comprises electrical and/or electronic control units, a supply means for the coating medium or media and if appropriate compressed-air and/or vacuum connections. If shielding or process gases are required, these gases are likewise supplied. For coating using fine coating nozzles, the coating medium must at least also be filtered before being fed into the coating unit in order to avoid contamination with particles. In the case where piezo-inkjet nozzles are used, it is advantageous to degas the coating medium in order to allow high actuation frequencies of the coating nozzles of up to approximately 50 kHz.

A coating unit 200 comprises a plurality of metering heads 250. A metering head 250 comprises at least two nozzles 260. The nozzles 260 are in a linear arrangement. To achieve the desired resolution of nozzles per unit length along the direction 320, the metering heads 250 may be in various arrangements, for example in a linear arrangement, a staggered arrangement, a herringbone pattern or combinations thereof.

Examples of possible arrangements of metering heads 250 are illustrated in FIGS. 10A to 10D. Different arrangements of the metering heads 250 and therefore of the nozzles 260 provided in linear form at constant intervals thereon makes it possible to achieve different resolutions of nozzles per unit length along the direction 320. The direction 320 is in this case perpendicular to the substrate running direction 310. To illustrate the resolution, the figures in each case indicate auxiliary lines 270 in the substrate running direction 310.

Figure 10A:
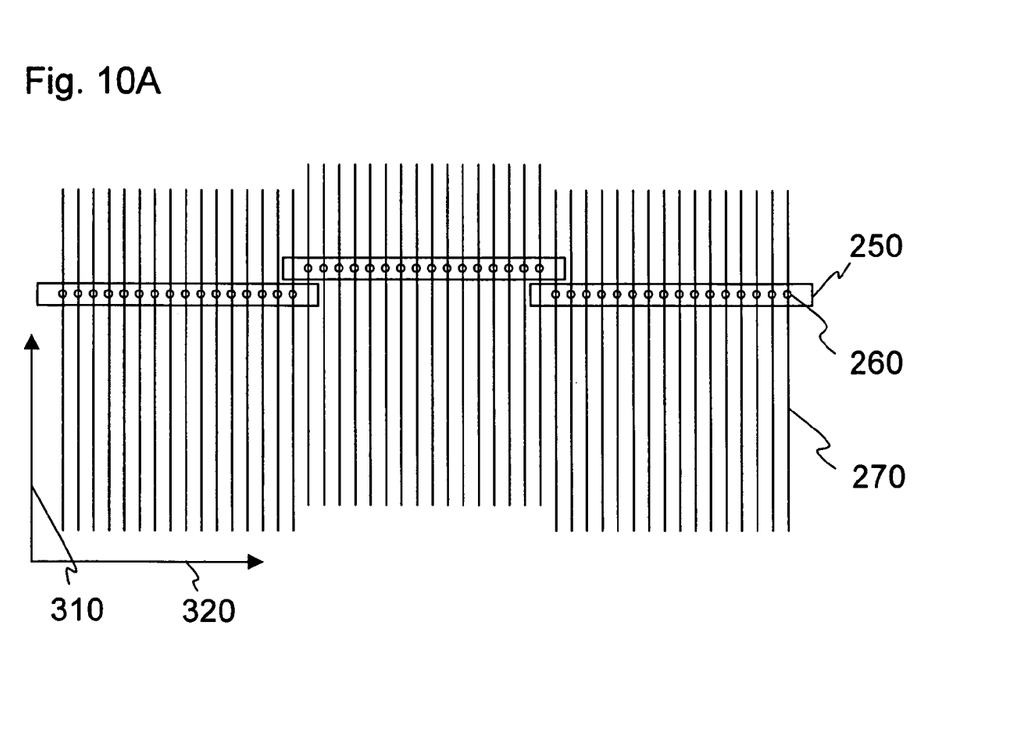

FIG. 10A diagrammatically depicts a simple linear arrangement of the metering heads 250. In this example, the resolution of the arrangement of nozzles per unit length along the direction 320 is produced by the resolution of an individual metering head 250.

Figure 10B:
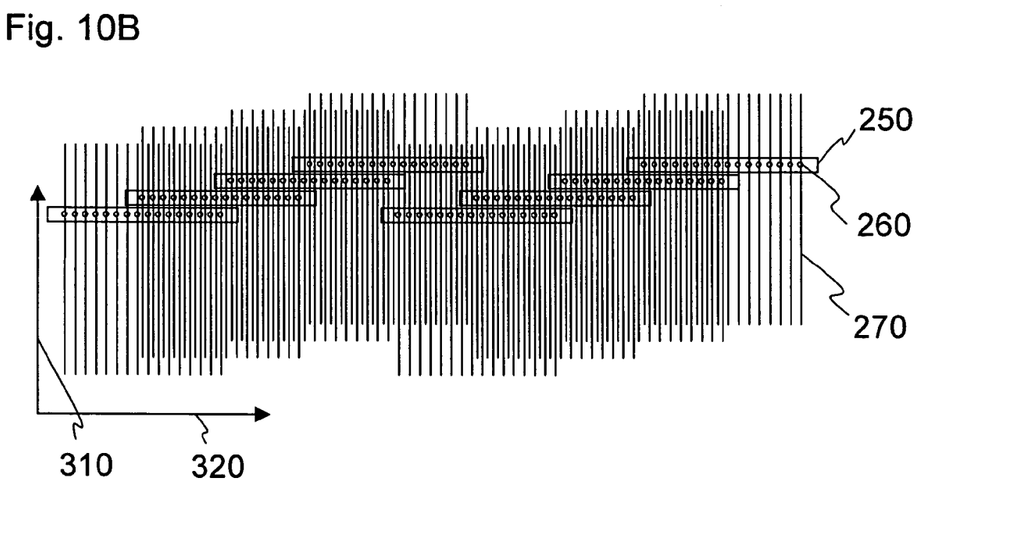

FIG. 10B diagrammatically depicts a linear, staggered arrangement. In this arrangement, the units of nozzles 260 arranged in linear form on the individual metering heads 250 are arranged offset one behind the other in such a way as to increase the resolution.

Figure 10C:
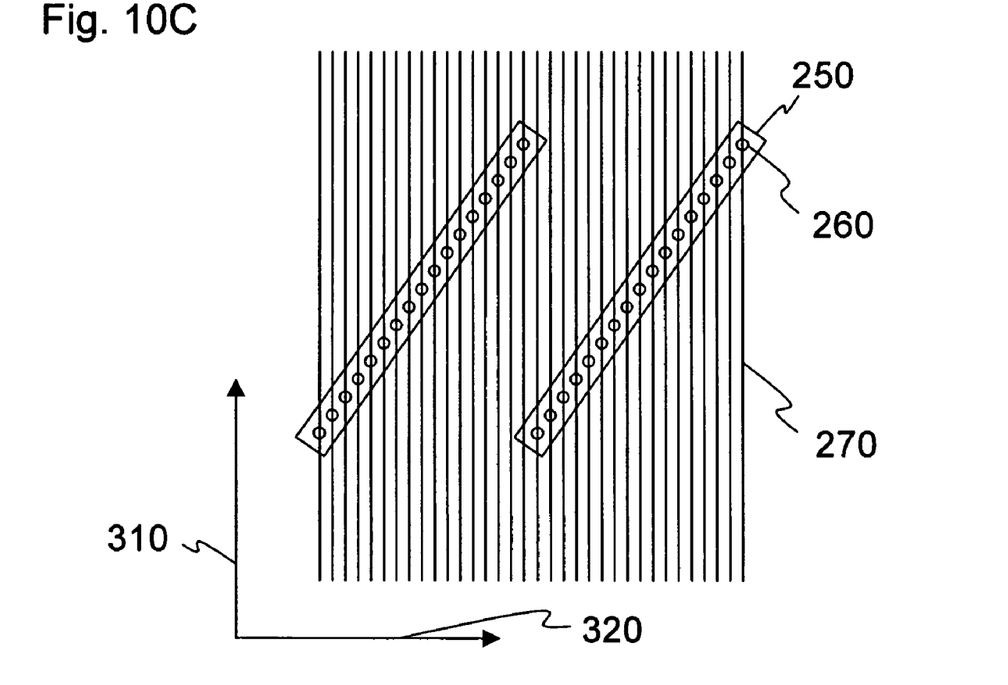
Figure 10D:
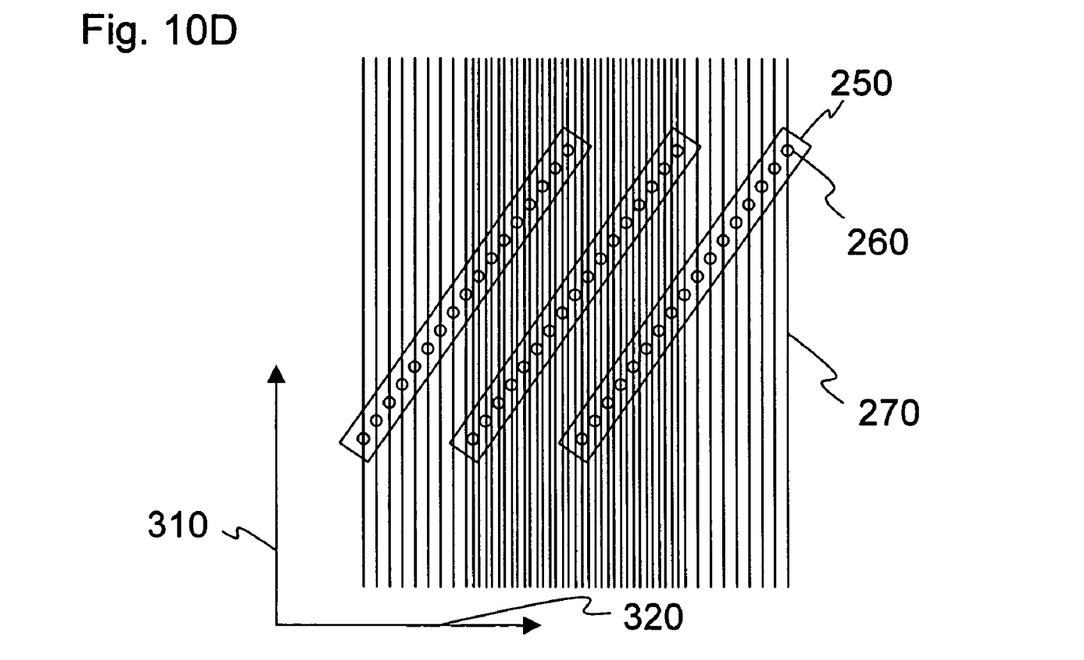

FIG. 10C diagrammatically depicts an arrangement with a herringbone structure. The herringbone structure indicates an arrangement of the metering heads 250 in which the axis on which the at least two nozzles 260 of the metering head 250 are arranged is rotated through an angle of between 0° and 90° with respect to the direction 320 within the plane defined by the directions 310 and 320, so that the nozzles are closer together along direction 320. The angle and spacing may be selected in such a way that if there are more than two nozzles the nozzles of two adjacent heads intersect one another, producing a combination of a herringbone arrangement and a staggered arrangement. This is illustrated in FIG. 10D.

The advantage of the herringbone structure consists in the possibility of using a space-saving arrangement of the heads and facilitating the mechanical orientation of adjacent heads. Furthermore, the two methods may also be combined. To achieve greater layer thicknesses, it is also possible for a plurality of coating units of this type to be arranged in succession in the direction 310; of course, it is also possible for a plurality of coating devices to be used for this purpose.

The combination of metering heads 250 in a herringbone arrangement and of the cleaning unit described above has the additional advantage that the direction of movement of the cleaning cloth is not parallel or perpendicular to the axis on which the nozzles 260 are oriented, i.e. the nozzle axis.

It is also possible to realize a simplified solution for cleaning a coating unit 200, in which a wiper covered with cloth moves over the nozzle surface of the coating unit 200; it should be ensured that the wiping movement does not take place perpendicular or parallel to the nozzle axis. The coating device 110 described above can be used, for example, in a coating machine for coating sheets (sheet-coating machine) for example instead of a conventional roller coating mechanism. In this case, coating is applied either to the entire surface or position sensors additionally have to be fitted in order to record the position and angle of the sheet prior to coating, so that the coating can be carried out accurately. A further option is to slightly modify a conventional roller coating machine, in which the sheet, before it passes through the coating device 110, is oriented in such a way that the leading edge is parallel to the coating device 110. Then, however, the sheet should be fixed on the conveyor device, for example by means of vacuum, so that the sheet can no longer rotate. In this way, the coating pattern merely has to be oriented with its sides in an accurate position but does not have to be rotated. The advantage is a significantly reduced level of calculations required to orient the coating pattern.

Furthermore, the device may be used in an offset printing press rather than in a coating mechanism. In this case, it is possible to dispense with positioning of the substrate altogether, since the sheets are already oriented in the press. This advantage can also be exploited when fitting the device in a screen-printing machine. The above examples are from the graphics industry sector. It is also possible to mention numerous further application areas, such as for example the use of the device for the decorative or complete painting of furniture/furniture parts or other objects which are to be painted.

LIST OF REFERENCE NUMERALS

1 Apparatus for applying coatings
2 Base
3 Surface of base 2 that is to be coated
4 Coating unit
5 Conveyor device
6 Drying unit
8 UV-curing unit
9 Cooling unit
10 Metering head
12 Computer
14, 15 Interface 16 Nozzle
17 Valve
171 Electromagnetic/piezoelectric actuator
18 Supply conductors to nozzles 16
19 Valve needle
20 Reservoir
21 Preheating device
22 Coating material
23 Pump device
24 Drop
26 Cured coating
28 Trench structures in coating 26
30 Uncovered regions on surface that has been coated in patterned form
32 Metallization
34 Metallized regions
36 Position-determining device
38 Guide rail
40 Stepper motor
42 Gearwheel
44 Toothed belt
46 Printing cylinder
48 Lifting apparatus
50 Patterned coating
51, 52 Reels
53 Rollers
54 First direction
55 Conveyor belt
56 Second direction, substantially perpendicular to direction 54
58 First individual layer of a multilayer Coating
60 Second individual layer of a multilayer Coating
62 First region
64 Second region
66 Third individual layer of a multilayer Coating
100 Feed device for individual substrates
101 Removal device for individual substrates
110 Coating device
120 Dust-tight housing
130 Stock reel for cleaning cloth
140 Nozzle for cleaning liquid
150 Cleaning roller
160 Cleaning cloth
170 Winding apparatus
180 Protective plate as safety spacer
190 Seal for closing off the coating unit during the cleaning operation
200 Coating unit in coating position
201 Coating unit in cleaning position
210 Axis of rotation
250 Metering head
260 Nozzle
270 Auxiliary lines illustrating the nozzle Spacing along direction 320
310 A first direction
320 A second direction substantially perpendicular to direction 310
330 A third direction substantially perpendicular to directions 310 and 320

The invention claimed is:

1. A method for applying coatings to surfaces, comprising the steps of:
moving a base having a surface to be coated and a metering head relative to one another; and
applying a fluid coating material to the surface through a nozzle in response to at least one control signal generated by a computer, wherein the step of applying the fluid coating material comprises applying a varnish that includes at least one component of a radiation-curable system and preheating the fluid coating material in order to reduce the viscosity of the fluid coating material.

2. The method as claimed in claim 1, wherein the step of applying a fluid coating material to the surface comprises the step of applying a fluid coating material through a nozzle selected from the group consisting of a bubble-jet nozzle, an ink-jet nozzle, a piezo-jet nozzle, and any combinations thereof.

3. The method as claimed in claim 1, wherein the step of applying a fluid coating material to the surface comprises the step of opening a valve.

4. The method as claimed in claim 1, wherein the fluid coating material comprises a thermoplastic.

5. The method as claimed in claim 4, wherein the thermoplastic is selected from a group consisting of polyethylene, polypropylene, polyacrylate, polymethacrylate, polyacrylonitrile, polybutadiene, polyamide, polyester, polyether, polyether ketone, polyvinyl acetate, polyacetal, polyvinyl acetate, polyolefin, polycarbonate, polyether block amide, PSU, PES, PPS, PVC, PVDC, PET, PS, PTFE, PVDF, PF, polyimide, polyimide derivative, cellulose derivative, and and any combinations thereof.

6. The method as claimed in claim 1, wherein the step of applying a fluid coating material to the surface comprises the step of applying a coating material that includes a dissolved plastic.

7. The method as claimed in claim 1, wherein the step of applying a fluid coating material to the surface comprises the step of applying a coating material that includes at least one component of a chemically reactive system.

8. The method as claimed in claim 7, wherein the chemically reactive system comprises a system selected from the group consisting of an isocyanate-crosslinking system, a polyurethane system, an epoxy system, a silicone system, a derivative of one of these systems, and any combinations thereof.

9. The method as claimed in claim 1, wherein the step of applying a fluid coating material to the surface comprises the step of applying a coating material that includes at least one component of a thermally crosslinkable system.

10. The method as claimed in claim 9, wherein the thermally crosslinkable system comprises a material selected from the group consisting of a polyester-melamine, a urea-resin, an epoxy system, a polyester system, and any combinations thereof.

11. The method as claimed in claim 1, wherein the radiation-curable system comprises a material selected from the group consisting of an acrylate, a methacrylate, a polyvinyl ether, a polyester, a maleic acid compound, a fumaric acid compound, an epoxy, a styrene compound, a silicone acrylate, and any combinations thereof.

12. The method as claimed in claim 1, further comprising the step of solidifying the fluid coating material on the surface.

13. The method as claimed in claim 12, wherein the step of solidifying the fluid coating material on the surface comprises the step of drying the fluid coating material.

14. The method as claimed in claim 12, wherein the step of solidifying the fluid coating material on the surface comprises the step of UV curing of the fluid coating material.

15. The method as claimed in claim 12, wherein the step of solidifying the fluid coating material on the surface comprises the step of polymerizing the fluid coating material.

16. The method as claimed in claim 12, wherein the step of solidifying the fluid coating material on the surface comprises the step of crosslinking the fluid coating material.

17. The method as claimed in claim 12, wherein the step of solidifying the fluid coating material on the surface comprises the step of reacting the fluid coating material with a coating.

18. The method as claimed in claim 1, wherein the step of applying a fluid coating material to the surface comprises the step of applying a first coating material through at least one first nozzle and applying a second coating material through at least one second nozzle.

19. The method as claimed in claim 1, wherein the step of moving a base having a surface to be coated and a metering head relative to one another comprises the step of advancing the base in a first direction.

20. The method as claimed in claim 19, wherein the base is moved relative to the metering head in the first direction at a rate of up to 2000 meters per minute.

21. The method as claimed in claim 19, wherein the step of moving a base and a metering head relative to one another further comprises the step of moving the metering head along a second direction that runs transversely to the first direction.

22. The method as claimed in claim 1, wherein the fluid coating material is preheated to up to 300° C.

23. The method as claimed in claim 1, wherein the fluid coating material has a viscosity of from 8 to 100 mPa·s.

24. The method as claimed in claim 1, wherein the fluid coating material at room temperature has a viscosity in a range from 50 mPa·s to 10 Pa·s.

25. The method as claimed in claim 1, further comprising the step of feeding the fluid coating material to the nozzle under superatmospheric pressure.

26. The method as claimed in claim 1, wherein the base is wound up on a first reel, and the method further comprises the step of unwinding the base from the first reel.

27. The method as claimed in claim 26, further comprising the step of winding up the base on to a second reel.

28. The method as claimed in claim 1, further comprising the step of at least partially removing the fluid coating material from the surface.

29. The method as claimed in claim 1, further comprising the step of orienting the base relative to the metering head.

30. The method as claimed in claim 1, wherein the step of applying a fluid coating material to the surface comprises the step of applying coating material to at least one region of the base that has a different refractive index than adjacent regions of the base.

31. The method as claimed in claim 30, wherein the at least one region defines an optical element.

32. The method as claimed in claim 1, wherein the step of applying a fluid coating material to the surface comprises the step of applying an image to a printing form.

33. The method as claimed claim 1, further comprising repeating the steps of moving a base having a surface to be coated and a metering head relative to one another and applying a fluid coating material to the surface more than once.

\* \* \* \* \*